No. 118,716.  Patented Sep. 5, 1871.

E. P. Harnish's Seed & Fertilizer Dropper.

Witnesses:
Chas. Nida
Wm. H. C. Smith

Inventor:
E. P. Harnish
per
Attorneys.

118,716

UNITED STATES PATENT OFFICE.

EDWARD P. HARNISH, OF FELTON, DELAWARE.

IMPROVEMENT IN SEED AND FERTILIZER-DROPPERS.

Specification forming part of Letters Patent No. 118,716, dated September 5, 1871.

*To all whom it may concern:*

Be it known that I, EDWARD P. HARNISH, of Felton, in the county of Kent and State of Delaware, have invented a new and Improved Seed and Fertilizer-Dropper; and I do hereby declare that the following is a full, clear, and exact description thereof, which will enable others skilled in the arts to make and use the same, reference being had to the accompanying drawing forming part of this specification.

My invention consists in improving compound seed and fertilizer-droppers, as hereinafter fully described and subsequently pointed out in the claims.

Figure 1:
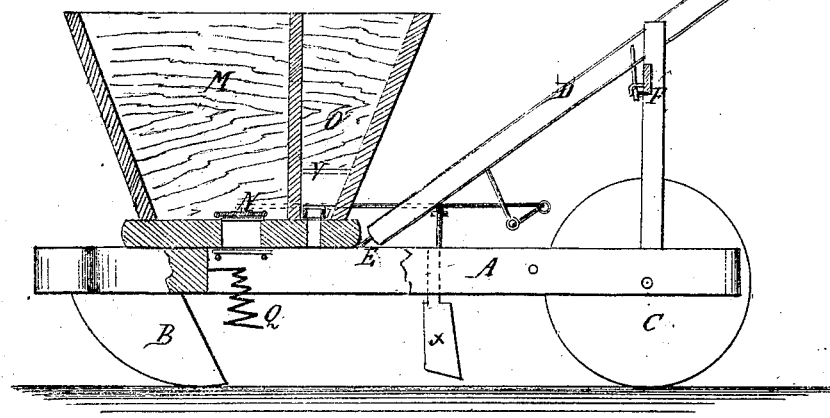
Figure 2:
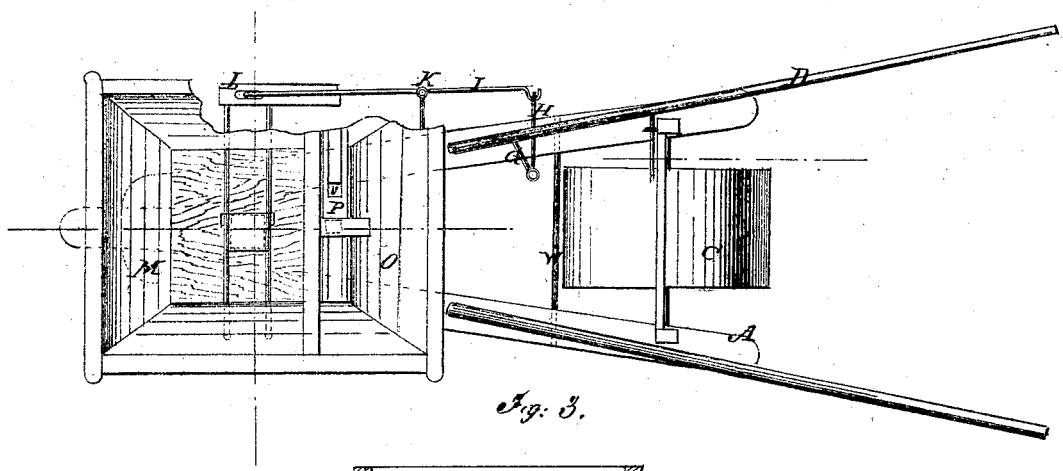
Figure 3:
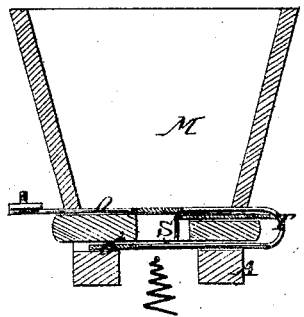

Figure 1 is a sectional elevation of my improved machine taken on the line $x\ x$ of Fig. 2. Fig. 2 is a plan view with a part broken out, and Fig. 3 is a transverse section taken on the line $y\ y$ of Fig. 1.

Similar letters of reference indicate corresponding parts.

The frame A is similar to the frames of other machines to be guided by hand, and is mounted on a marker, B, at the front, and a wheel, C, at the rear. One of the handles D is jointed to the frame at the lower end, as shown at E, and also to the post F, so that the attendant can oscillate it around its longitudinal axis slightly while holding it, and it is connected, by a rigid arm, G, and a link, H, with a lever, I, pivoted at or near its center K to the frame and connected at L to the dropper-slides, so that the said vibrations of the handle will move the slides back and forth. M is the hopper for the fertilizer, and N the slide therefor. O is the grain-hopper, and P the slide for it. The hole for the fertilizer to drop through can be opened more or less by the sliding gate S. The said dropper-slide O consists of two plates $O^1$ and $O^2$, $O^1$ being above the bottom of the hopper and $O^2$ below it, but connected by the bent rods or wires T extending outward and backward under the said bottom, and so connecting them that when the hole is covered by the plate $O^1$ it is uncovered by the plate $O^2$, and vice versa, the latter being drawn under it as the former is drawn away from it, by which one discharge will take place at two movements of the slide. I may have one or two dropping-holes, U, in the corn-slide, which works under a bar, V, with a brush to cut off the corn, and over a hole under the brush; but I may have one only, in which case I propose to arrange it with the fertilizer-dropper so that they will drop alternately—that is, when the handle is moved out the fertilizer will drop, and when moved in the corn will drop. By this I may so time the movements that the fertilizer will first drop in the place where the hill of corn is to be and then the corn will drop upon it. The marker B is a broad block of wood attached to the front and curved at the front like a runner, so that it may run along across the furrow made for dropping the corn in, so that the rows, being marked in one direction by the furrows, will be marked in the other by the dropping-machine, and will be thereby made straight in both. W is a rod stretched across the frame in front of the wheel for scraping off the earth adhering to it. X represents the covering-blades, which are applied as in the ordinary way.

The oscillating handle D may be connected to the dropper-slides by any other suitable or preferred arrangement of devices instead of the arm-link and connecting-rod here shown. For instance, it may have a rod extending from its end rigidly along under the bottom of the hopper, or in a groove in the under side of the bottom and connected to the slides, so that, by its swinging motion at the free end, due to being bent out of the right line of the handle, it will cause the slide to move sufficiently.

Having thus described my invention, I claim as new and desire to secure by Letters Patent—

1. A laterally-pivoted handle and lever, D I, connected together and arranged as described, to reciprocate the dropper-slides horizontally and laterally, in the manner set forth.

2. In combination with a manure-hopper, M, and slide N, the limber conical wire coil $e$, arranged to vibrate and scatter broadcast the guano, bone-dust, or other powdered fertilizer.

E. P. HARNISH.

Witnesses:
SMITH FOSSETT,
JACOB KULP.